United States Patent
Yang

(10) Patent No.: US 9,873,332 B2
(45) Date of Patent: Jan. 23, 2018

(54) ELECTRIC VEHICLE AND METHOD AND SYSTEM FOR CONTROLLING HIGH-VOLTAGE SYSTEM CIRCUIT THEREOF

(71) Applicant: BEIQI FOTON MOTOR CO., LTD., Beijing (CN)

(72) Inventor: Weibin Yang, Beijing (CN)

(73) Assignee: BEIQI FOTON MOTOR CO., LTD., Beijing (CN)

( * ) Notice: Subject to any disclaimer, the term of this patent is extended or adjusted under 35 U.S.C. 154(b) by 264 days.

(21) Appl. No.: 14/744,995

(22) Filed: Jun. 19, 2015

(65) Prior Publication Data

US 2016/0009193 A1   Jan. 14, 2016

(30) Foreign Application Priority Data

Jul. 14, 2014 (CN) .......................... 2014 1 0334076

(51) Int. Cl.
| | |
|---|---|
| *H01H 33/66* | (2006.01) |
| *B60L 11/18* | (2006.01) |
| *B60L 1/00* | (2006.01) |
| *H02H 7/18* | (2006.01) |
| *B60L 3/04* | (2006.01) |
| *B60L 3/00* | (2006.01) |

(52) U.S. Cl.
CPC .............. *B60L 3/04* (2013.01); *B60L 3/0046* (2013.01); *B60L 2240/547* (2013.01)

(58) Field of Classification Search
CPC . H01H 33/66; B60L 11/18; B60L 1/00; B60L 3/04; B60L 11/1861; H02H 7/18
USPC ................................................ 307/9.1–10.8
See application file for complete search history.

(56) References Cited

U.S. PATENT DOCUMENTS

| | | | | |
|---|---|---|---|---|
| 5,994,789 A * | 11/1999 | Ochiai | ............... | B60L 11/1803 180/65.1 |
| 6,157,165 A * | 12/2000 | Kinoshita | ............. | H02J 7/0019 320/116 |
| 7,368,829 B2 * | 5/2008 | Tezuka | ................. | H01H 47/002 307/9.1 |
| 7,608,940 B2 * | 10/2009 | Osawa | .................. | H02J 7/0029 307/10.7 |
| 2006/0021098 A1 * | 1/2006 | Tezuka | ................. | H01H 47/002 477/7 |

(Continued)

*Primary Examiner* — Brandon S Cole
(74) *Attorney, Agent, or Firm* — David D. Brush; Westman Champlin & Koehler, P.A.

(57) ABSTRACT

A method for controlling a high-voltage system circuit of an electric vehicle comprises: judging whether the circuit is in a closed-circuit state after receiving an instruction of opening the circuit; judging whether the positive contactor is in an on-state and whether an instruction of turning on the positive contactor is valid if the circuit is in a closed-circuit state; sending an instruction of turning off the positive contactor if the positive contactor is in an on-state and the instruction of turning on the positive contactor is valid; sending an instruction of turning off the negative contactor; judging whether the pre-charging contactor is in an on-state and whether an instruction of turning on the pre-charging contactor is valid; sending an instruction of turning off the pre-charging contactor if the pre-charging contactor is in an on-state and the instruction of turning on the pre-charging contactor is valid.

14 Claims, 5 Drawing Sheets

(56) References Cited

U.S. PATENT DOCUMENTS

| | | | |
|---|---|---|---|
| 2007/0221627 A1* | 9/2007 | Yugou | H01H 47/002 218/136 |
| 2010/0001582 A1* | 1/2010 | Newhouse | B60L 11/18 307/10.1 |
| 2011/0084704 A1* | 4/2011 | Myoen | B60L 3/12 324/538 |
| 2011/0210746 A1* | 9/2011 | Yugou | B60L 3/04 324/427 |

* cited by examiner

ELECTRIC VEHICLE AND METHOD AND SYSTEM FOR CONTROLLING HIGH-VOLTAGE SYSTEM CIRCUIT THEREOF

CROSS-REFERENCE TO RELATED APPLICATIONS

This application claims the priority and benefit of Chinese Patent Application No. 201410334076.8, filed with State Intellectual Property Office, P.R.C. on Jul. 14, 2014, the entirety of which is hereby incorporated by reference.

FIELD

The present disclosure relates to an electric vehicle field, and more particularly relates to a method for controlling a high-voltage system circuit of an electric vehicle, a system for controlling a high-voltage system circuit of an electric vehicle, and an electric vehicle including the high-voltage system circuit.

BACKGROUND

When there is a failure in an electric vehicle or the electric vehicle is deenergized normally, a relay in a high-voltage system of the electric vehicle is required to be turned off so as to open a voltage circuit of a power battery in the electric vehicle.

In a related art, in a normal opening process of the high-voltage system circuit, opening the high-voltage system circuit may be implemented by turning off for example, the positive relay and the negative relay. For example, an instruction of turning off the positive relay (such as a positive contactor (PC)) may be sent to turn off the positive relay, and an instruction of turning off the negative relay (such as a negative contactor (NC)) may be sent to turn off the negative relay, such that the high-voltage system circuit may be opened. When an urgent failure (such as an insulation failure, an over-voltage fault of the power battery group, an over-temperature fault of the power battery group, an over-current fault of the power battery group, etc.) occurs, the circuit may be opened urgently by turning off components, such as, the positive relay, the negative relay, or a pre-charging relay (such as a pre-charging contactor (PreC)). The control method of turning off the relay urgently is simple. For example, an instruction of turning off the positive relay, an instruction of turning off the negative relay and an instruction of turning off the pre-charging relay may be sent to the high-voltage system simultaneously so as to turn off the positive relay, the negative relay and the pre-charging relay, such that a user's safety may be guaranteed. However, since a loop current of the voltage circuit of the power battery is relatively larger, one or more of these relays cannot be turned off normally, thus bringing a hidden danger. In addition, it is unable to determine whether a relay is really in a turned-off state. If a relay that needs to be turned off is not turned off, an opportunity of correcting this error may be lost. As such, the security of the electric vehicle cannot be guaranteed, and significant negative consequences may be caused.

SUMMARY

The present disclosure is aimed to solve at least one of the above problems to some extent.

Accordingly, a first objective of the present disclosure is to provide a method for controlling a high-voltage system circuit of an electric vehicle, which may enhance the security of the electric vehicle and a power battery in the electric vehicle.

A second objective of the present disclosure is to provide a system for controlling a high-voltage system circuit of an electric vehicle.

A third objective of the present disclosure is to provide an electric vehicle.

In order to achieve the above objectives, embodiments of a first aspect of the present disclosure provide a method for controlling a high-voltage system circuit of an electric vehicle. The high-voltage system circuit comprises a power battery, a positive contactor, a pre-charging contactor, a load and a negative contactor, an anode of the power battery is connected to the load via the positive contactor, a cathode of the power battery is connected to the load via the negative contactor, and the pre-charging contactor and the positive contactor are connected in parallel, and the method comprises: judging whether the high-voltage system circuit is in a closed-circuit state after receiving an instruction of opening the high-voltage system circuit; judging whether the positive contactor is in an on-state and whether an instruction of turning on the positive contactor is valid if the high-voltage system circuit is in a closed-circuit state: sending an instruction of turning off the positive contactor to the positive contactor if the positive contactor is in an on-state and the instruction of turning on the positive contactor is valid; sending an instruction of turning off the negative contactor to the negative contactor after a delay time; judging whether the pre-charging contactor is in an on-state and whether an instruction of turning on the pre-charging contactor is valid after a further the delay time; and sending an instruction of turning off the pre-charging contactor to the pre-charging contactor if the pre-charging contactor is in an on-state and the instruction of turning off the pre-charging contactor is valid.

With the method for controlling a high-voltage system circuit of an electric vehicle according to embodiments of the present disclosure, when an urgent failure occurs on a power battery of the electric vehicle, the instruction of turning off the positive electrode may be sent to the positive electrode after judging whether the positive contactor is in an on-state and whether the instruction of turning on the positive contactor is valid, the instruction of turning off the negative contactor may be sent to the negative contactor, and an instruction of turning off the pre-charging contactor may be sent to the pre-charging contactor after judging whether the pre-charging contactor is in an on-state and whether the instruction of turning on the pre-charging contactor is valid, such that the high-voltage system circuit may be opened urgently, i.e. being in an open-circuit state. In this way, operations of the contactors in the high-voltage system circuit may ensure that the high-voltage system circuit is in an open-circuit mode, thus both enhancing the security of the electric vehicle and the power battery, and removing a hidden dangerous.

In some embodiments of the present disclosure, the method further comprises sending the instruction of turning off the positive contactor to the positive contactor, the instruction of turning off the negative contactor to the negative contactor and the instruction of turning off the pre-charging contactor to the pre-charging contactor if the high-voltage system circuit is not in a closed-circuit state.

In some embodiments of the present disclosure, the method further comprises: detecting an anode voltage U1 of the power battery and a voltage U2 between the load and the positive contactor after sending the instruction of turning off the positive contactor, the instruction of turning off the negative contactor and the instruction of turning off the pre-charging contactor; judging whether U2 is greater than or equal to $U1*(1+U\_P1)$ or whether U2 is less than or equal to $U1*(1-U\_P1)$, whether the delay time is less than a predetermined time, and whether a load voltage is valid, in which U_P1 is a standard value; determining that the positive contactor, the negative contactor and the pre-charging contactor each are in an off-state if U2 is greater than or equal to $U1*(1+U\_P1)$ or if U2 is less than or equal to $U1*(1-U\_P)$, the delay time is less than the predetermined time, and the load voltage is valid; and determining that at least one of the positive contactor, the negative contactor and the pre-charging contactor is in an on-state if the load voltage is invalid and the delay time is less than the predetermined time; and determining that at least one of the positive contactor, the negative contactor and the pre-charging contactor has an error of turning on over time if the load voltage is invalid and the delay time is greater than or equal to the predetermined time.

In some embodiments of the present disclosure, the method further comprises sending the instruction of turning off the negative contactor to the negative contactor if the positive contactor is not in an on-state or if the instruction of turning on the positive contactor is invalid.

In some embodiments of the present disclosure, the method further comprises: judging whether the negative contactor is in an on-state and whether an instruction of turning on the negative contactor is valid; and judging whether the pre-charging contactor is in an on-state and whether the instruction of turning on the pre-charging contactor is valid if the instruction of turning on the negative contactor is invalid.

Embodiments of a second aspect of the present disclosure provide a system for controlling a high-voltage system circuit of an electric vehicle. The high-voltage system circuit comprises a power battery, a positive contactor, a pre-charging contactor, a load and a negative contactor, an anode of the power battery is connected to the load via the positive contactor, a cathode of the power battery is connected to the load via the negative contactor, and the pre-charging contactor and the positive contactor are connected in parallel, and the system comprises: a judging module configured to judge whether the high-voltage system circuit is in a closed-circuit state after receiving an instruction of opening the high-voltage system circuit, to judge whether the positive contactor is in an on-state and whether an instruction of turning on the positive contactor is valid if the high-voltage system circuit is in a closed-circuit state, and to judge whether the pre-charging contactor is in an on-state and whether an instruction of turning on the pre-charging contactor is valid; and a control module configured to send an instruction of turning off the positive contactor to the positive contactor if the judging module determines that the positive contactor is in an on-state and that the instruction of turning on the positive contactor is valid, to send an instruction of turning off the negative contactor to the negative contactor after a delay time, and to send an instruction of turning off the pre-charging contactor to the pre-charging contactor if the judging module determines that the pre-charging contactor is in an on-state and that the instruction of turning on the pre-charging contactor is valid after a further the delay time.

With the system for controlling a high-voltage system circuit of an electric vehicle according to embodiments of the present disclosure, when an urgent failure occurs on a power battery of the electric vehicle, the instruction of turning off the positive electrode may be sent to the positive electrode after judging whether the positive contactor is in an on-state and whether the instruction of turning on the positive contactor is valid, an instruction of turning off the negative contactor may be sent to the negative contactor, an instruction of turning off the pre-charging contactor may be sent to the pre-charging contactor after judging whether the pre-charging contactor is in an on-state and whether the instruction of turning on the pre-charging contactor is valid, such that the high-voltage system circuit may be opened urgently, i.e. being in an open-circuit state. In this way, operations of the contactors in the high-voltage system circuit may ensure that the high-voltage system circuit is in an open-circuit mode, thus both enhancing the security of the electric vehicle and the power battery, and removing a hidden dangerous.

In some embodiments of the present disclosure, the control module is further configured to send the instruction of turning off the positive contactor to the positive contactor, the instruction of turning off the negative contactor to the negative contactor and the instruction of turning off the pre-charging contactor to the pre-charging contactor if the judging module determines that the high-voltage system circuit is not in a closed-circuit state.

In some embodiments of the present disclosure, the system further comprises a detecting module configured to detect an anode voltage U1 of the power battery and a voltage U2 between the load and the positive contactor after sending the instruction of turning off the positive contactor, the instruction of turning off the negative contactor and the instruction of turning off the pre-charging contactor; and the judging module is further configured to judge whether U2 is greater than or equal to $U1*(1+U\_P1)$ or whether U2 is less than or equal to $U1*(1-U\_P1)$, whether the delay time is less than a predetermined time, and whether a load voltage is valid, in which U_P1 is a standard value. The control module is further configured to: determine that the positive contactor, the negative contactor and the pre-charging contactor each are in an off-state if U2 is greater than or equal to $U1*(1+U\_P1)$ or if U2 is less than or equal to $U1*(1-U\_P1)$, the delay time is less than the predetermined time, and the load voltage is valid: determine that at least one of the positive contactor, the negative contactor and the pre-charging contactor is in an on-state if the load voltage is invalid and the delay time is less than the predetermined time; and determine that at least one of the positive contactor, the negative contactor and the pre-charging contactor has an error of turning on over time if the load voltage is invalid and the delay time is greater than or equal to the predetermined time.

In some embodiments of the present disclosure, the control module is further configured to send the instruction of turning off the negative contactor to the negative contactor if the positive contactor is not in an on-state or if the instruction of turning on the positive contactor is invalid.

Embodiments of a third aspect of the present disclosure provide an electric vehicle. The electric vehicle comprises the system for controlling a high-voltage system circuit of an electric vehicle described above.

With the electric vehicle according to embodiments of the present disclosure, when an urgent failure occurs on a power battery of the electric vehicle, the instruction of turning off the positive electrode may be sent to the positive electrode after judging whether the positive contactor is in an on-state and whether the instruction of turning on the positive contactor is valid, an instruction of turning off the negative contactor may be sent to the negative contactor, an instruction of turning off the pre-charging contactor may be sent to the pre-charging contactor after judging whether the pre-charging contactor is in an on-state and whether the instruction of turning on the pre-charging contactor is valid, such that the high-voltage system circuit may be opened urgently, i.e. being in an open-circuit state. In this way, operations of the contactors in the high-voltage system circuit may ensure that the high-voltage system circuit is in an open-circuit mode, thus both enhancing the security of the electric vehicle and the power battery, and removing a hidden dangerous.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
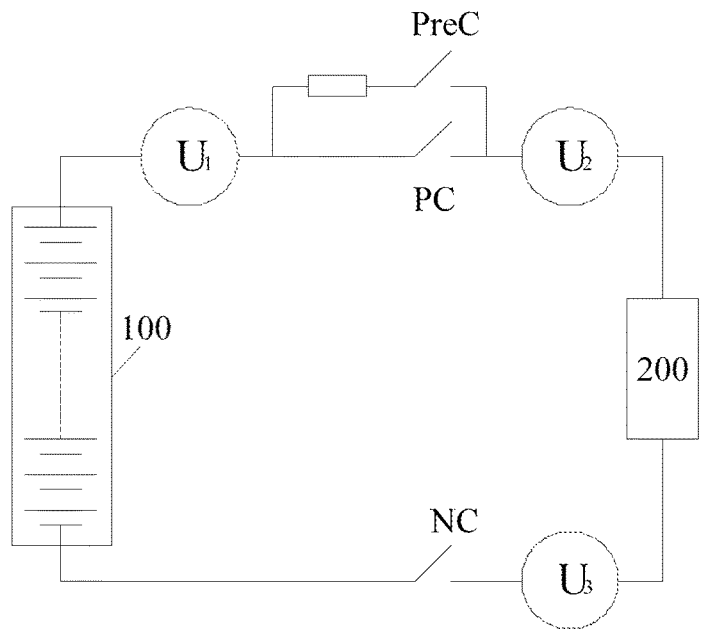
FIG. 1 is a block diagram of a high-voltage system in a related art.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, it should be understood that, unless specified or limited otherwise, terms such as "connected" and "coupled" should be understood broadly, and may be, for example, fixed connections, detachable connections, or integral connections; or may be mechanical or electrical connections; or may be direct connections or indirect connections via intervening structures, which can be understood by those skilled in the art according to specific situations.

A method for controlling a high-voltage system circuit of an electric vehicle, a system for controlling a high-voltage system circuit of an electric vehicle, and an electric vehicle comprising the system for controlling a high-voltage system circuit according to embodiments of the present disclosure will be described with reference to drawings.

Firstly, the method for controlling a high-voltage system circuit of an electric vehicle according to embodiments of the present disclosure will be described with reference to drawings. Referring to FIG. 1, the high-voltage system circuit comprises a power battery 100, a positive contactor PC, a pre-charging contactor PreC, a load 200 and a negative contactor NC, an anode of the power battery 100 is connected to the load 200 via the positive contactor PC, a cathode of the power battery 100 is connected to the load 200 via the negative contactor NC, and the pre-charging PreC contactor and the positive contactor PC are connected in parallel. Further, referring to FIG. 2, the method for controlling a high-voltage system circuit of an electric vehicle according to embodiments of the present disclosure comprises following steps.

At step S201, it is judged whether the high-voltage system circuit is in a closed-circuit state after receiving an instruction of opening the high-voltage system circuit.

In some embodiments, if the high-voltage system circuit is closed or is in a "closed-circuit state", components, such as a switch, a relay, a contactor, etc., may all in fully closed positions, i.e. the high-voltage system circuit forms a closed loop. In contrast, if the high-voltage system circuit is opened or in an opened state, at least one component, such as a switch, a relay, a contactor, etc., may be transitioned from the closed position to an open position, i.e. the high-voltage system circuit forms an open loop.

In an embodiment of the present disclosure, if it is determined that the high-voltage system circuit is not in a closed-circuit state, the method for controlling a high-voltage system circuit of an electric vehicle further comprises a step of sending an instruction of turning off the positive contactor to the positive contactor, an instruction of turning off the negative contactor to the negative contactor, and an instruction of turning off the pre-charging contactor to the pre-charging contactor. In this way, if a result of the judging step shows the high-voltage system circuit is not in a closed-circuit state, the positive contactor, the negative contactor, and the pre-charging contactor may all be turned off directly, such that the high-voltage system circuit may be opened urgently. With this step, the reliability and safety of the electric vehicle may be improved.

Figure 3A:
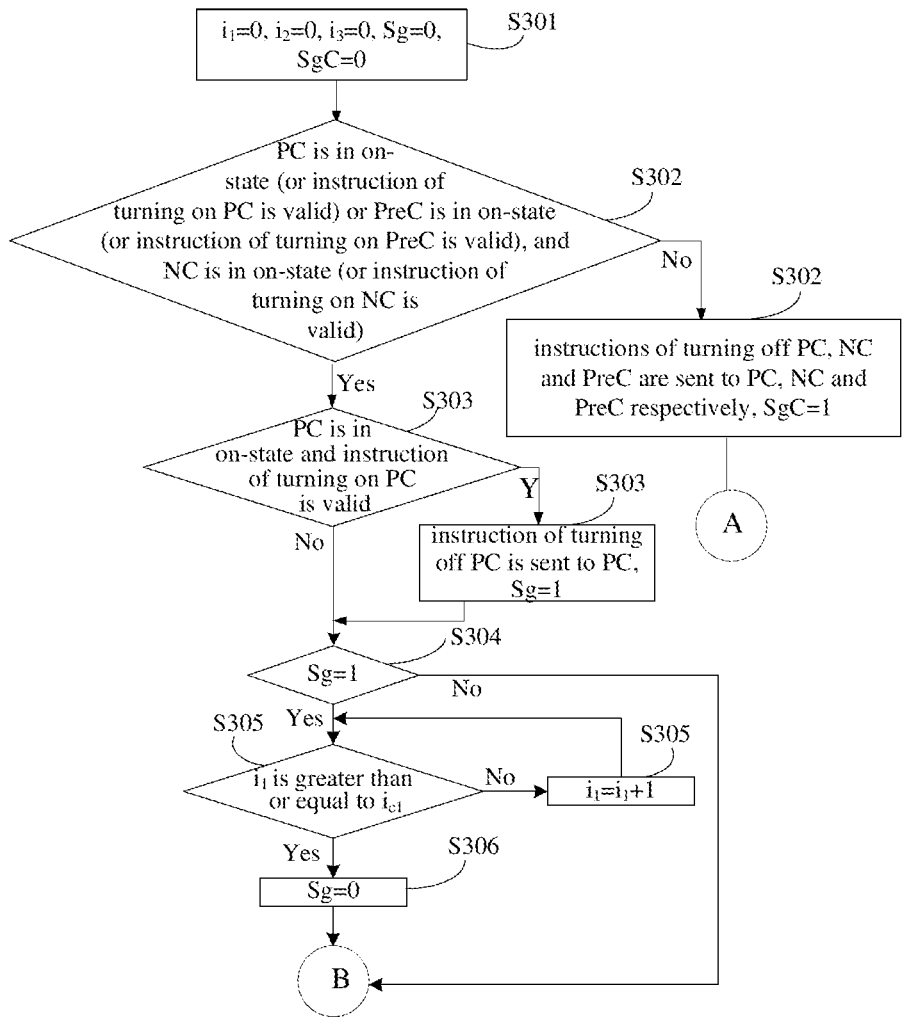
FIGS. 3(a), 3(b) and 3(c) are flow charts of methods for controlling a high-voltage system circuit of an electric vehicle according to embodiments of the present disclosure.

In an embodiment of the present disclosure, referring to FIG. 3(a), sending an instruction of turning off the positive contactor, an instruction of turning off the negative contactor and an instruction of turning off the pre-charging contactor comprises following steps.

At step S301, after receiving an instruction of opening the high-voltage system circuit (for example, an instruction of turning off a contactor) based on conditions such as insulation requirement of vehicle, over-heat fault of battery, over-voltage fault of battery, etc., it is set $i_1=0$, $i_2=0$, $i_3=0$, Sg=0, SgC=0, in which $i_1$, $i_2$ and $i_3$ are current parameters corresponding to U1, U2 and U3 shown in FIG. 1 respectively; Sg is a flag indicating whether an instruction of turning off a contactor is sent to one of the positive contactor PC, the negative contactor NC and the pre-charging contactor PreC, and if yes, it is set that Sg=1, or else it is set that Sg=0; SgC is a flag indicating whether instructions of turning off all contactors are sent to the positive contactor PC, the negative contactor NC and the pre-charging contactor PreC, and if yes, it is set that SgC=1, or else, it is set that SgC=0. In some embodiments, each of the positive contactor PC, the negative contactor NC and the pre-charging contactor PreC may be a relay.

At step S302, it is judged whether the positive contactor PC is in an on-state (or whether the instruction of turning on the positive contactor PC is valid) or whether the pre-charging contactor PreC is in an on-state (or whether the instruction of turning on the pre-charging contactor PreC is valid), and whether the negative contactor NC is in an on-state (or whether the instruction of turning on the negative contactor NC is valid). If yes, step S303 is followed; or else, the instruction of turning off the positive contactor PC is sent to the positive contactor PC, the instruction of turning off the negative contactor NC is sent to the negative contactor NC, the instruction of turning off the pre-charging contactor PreC is sent to the pre-charging contactor PreC, SgC=1, and step S313 is followed.

At step S202, it is judged whether the positive contactor is in an on-state and whether an instruction of turning on the positive contactor is valid if the high-voltage system circuit is in a closed-circuit state.

At step S203, an instruction of turning off the positive contactor is sent to the positive contactor if the positive contactor is in an on-state and the instruction of turning off the positive contactor is valid.

In an embodiment of the present disclosure, the method for controlling a high-voltage system circuit of an electric vehicle further comprises a step of sending an instruction of turning off the negative contactor to the negative contactor if the positive contactor is not in an on-state or if the instruction of turning on the positive contactor is invalid.

In an embodiment of the present disclosure, before sending the instruction of turning off the negative contactor to the negative contactor, the method for controlling a high-voltage system circuit of an electric vehicle further comprises steps of judging whether the negative contactor is in an on-state and whether the instruction of turning on the negative contactor is valid, and judging whether the pre-charging contactor is in an on-state and whether the instruction of turning on the pre-charging contactor is valid if the instruction of turning on the negative contactor is invalid.

In an embodiment of the present disclosure, referring to FIG. 3(a), said steps comprise following steps.

At step S303, it is judged whether the positive contactor PC is in an on-state and whether the instruction of turning on the positive contactor PC is valid. If yes, the instruction of turning off the positive contactor PC is sent to the positive contactor PC, Sg=1, and then step S304 is followed; or else, step S304 is followed.

At step S304, it is judged whether Sg=1. If yes, step S305 is followed; or else, step S307 is followed.

At step S204, an instruction of turning off the negative contactor is sent to the negative contactor after a delay time.

Figure 3B:
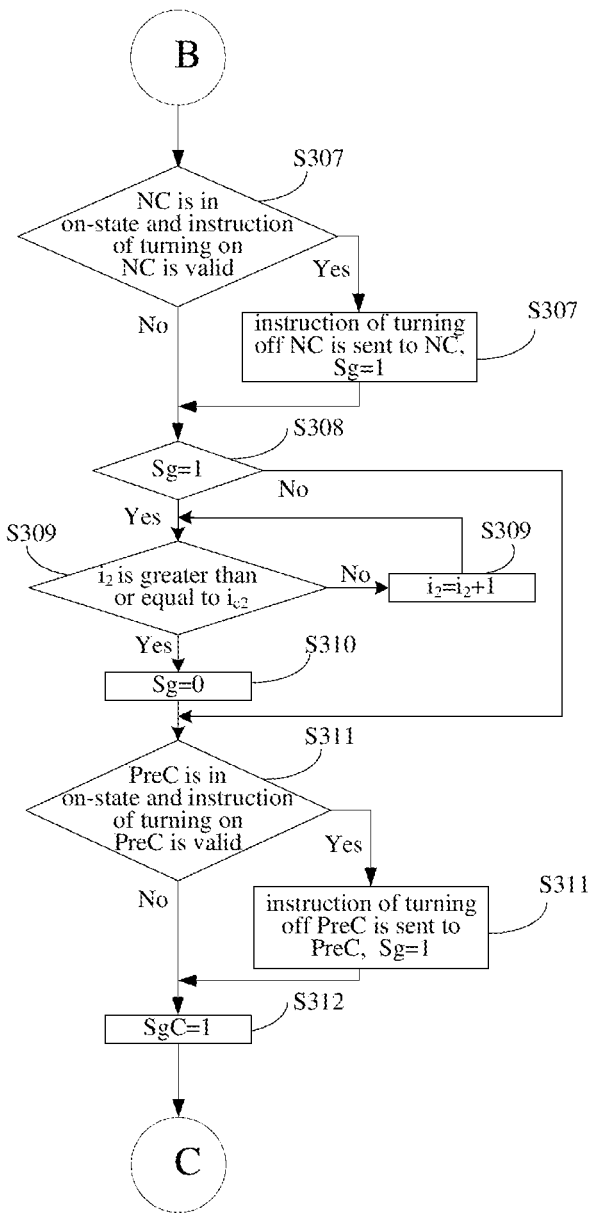

In an embodiment of the present disclosure, referring to FIGS. 3(a) and 3(b), the step S204 comprises following steps.

At step S305, it is judged whether $i_1$ is greater than or equal to $i_{c1}$, in which $i_{c1}$ is a standard value representing a waiting time after turning off the positive contactor PC. If yes, step S306 is followed; or else, it is set that $i_1=i_1+1$, and the step S305 is repeated.

At step S306, it is set that Sg=0, and then step S307 is followed.

At step S307, it is judged whether the negative contactor NC is in an on-state and whether the instruction of turning on the negative contactor NC is valid. If yes, the instruction of turning off the negative contactor NC is sent to the negative contactor NC, Sg=1, and then step S308 is followed; or else, step S308 is followed directly.

At step S308, it is judged whether Sg=1. If yes, step S309 is followed; or else, step S311 is followed.

At step S205, it is judged whether the pre-charging contactor is in an on-state and whether an instruction of turning on the pre-charging contactor is valid after a further the delay time.

In an embodiment of the present disclosure, referring to FIG. 3(b), the step S205 comprises following steps.

At step S309, it is judged whether $i_2$ is greater than or equal to $i_{c2}$, in which $i_{c2}$ is a standard value representing a waiting time after turning off the negative contactor NC. If yes, step S310 is followed; or else, it is set that $i_2=i_2+1$, and the step S309 is repeated.

At step S310, it is set that Sg=0, and step S311 is followed.

At step S311, it is judged whether the pre-charging contactor PreC is in an on-state and whether the instruction of turning on the pre-charging contactor PreC is valid. If yes, an instruction of turning off the pre-charging contactor PreC is sent to the pre-charging contactor PreC, Sg=1, and step S312 is followed; or else, step S312 is followed directly.

At step S312, it is set that SgC=1.

At step S206, an instruction of turning off the pre-charging contactor is sent to the pre-charging contactor if the pre-charging contactor is in an on-state and the instruction of turning off the pre-charging contactor is valid.

In some embodiments, with the above step, all of PC, NC and PreC are turned off and the high-voltage system circuit of the electric vehicle may be opened urgently, thus insuring the reliability and safety of the electric vehicle.

In an embodiment of the present disclosure, after opening the high-voltage system circuit, the method for controlling a high-voltage system circuit of an electric vehicle further comprises steps of: detecting an anode voltage U1 of the power battery and a voltage U2 between the load and the positive contactor after sending the instruction of turning off the positive contactor, the instruction of turning off the negative contactor and the instruction of turning off the pre-charging contactor; judging whether U2 is greater than or equal to U1*(1+U_P1) or whether U2 is less than or equal to U1*(1−U_P1), whether the delay time is less than a predetermined time, and whether a load voltage is valid, in which U_P1 is a standard value; determining that the positive contactor, the negative contactor and the pre-charging contactor are turned off if U2 is greater than or equal to U1*(1+U_P1) or if U2 is less than or equal to U1*(1−U_P1), the delay time is less than the predetermined time, and the load voltage is valid; judging that at least one of the positive contactor, the negative contactor and the pre-charging contactor is in an on-state if the load voltage is invalid and the delay time is less than the predetermined time; and judging that at least one of the positive contactor, the negative contactor and the pre-charging contactor has an error of turning on over time if the load voltage is invalid and the delay time is greater than or equal to the predetermined time.

Figure 3C:
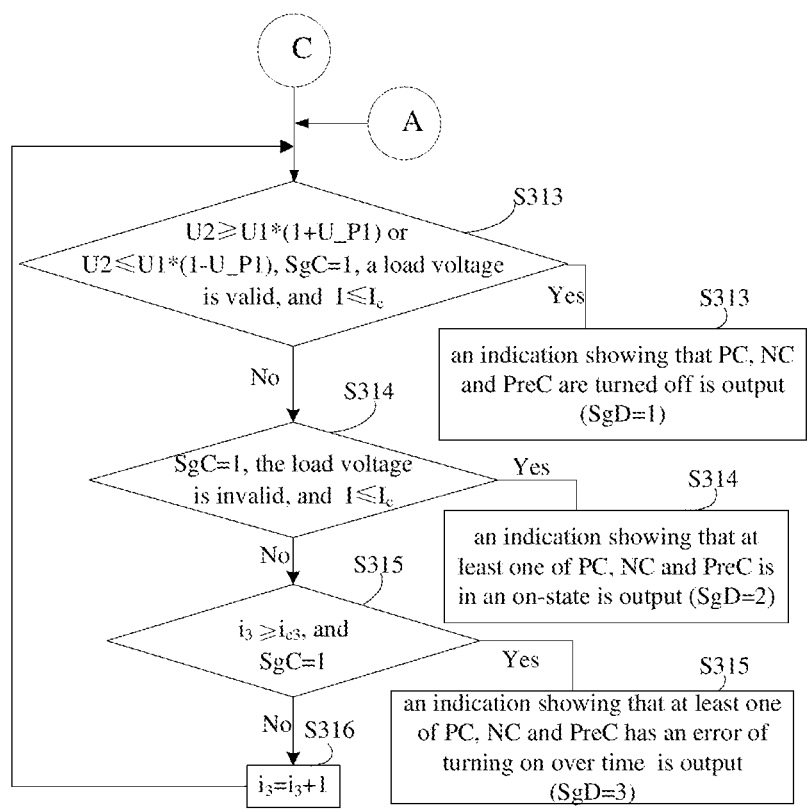

In an embodiment of the present disclosure, referring to FIG. 3(c), said steps comprise following steps.

At step S313, it is judged whether U2 is greater than or equal to U1*(1+U_P1) or whether U2 is less than or equal to U1*(1−U_P1), whether SgC=1, whether a load voltage is valid, and whether I is less than or equal to $I_c$, in which U1 is a voltage illustrated in FIG. 1, U2 is a voltage illustrated in FIG. 1, U_P1 is a standard value, I is a current in the high-voltage system circuit illustrated in FIG. 1, $I_c$ is standard value. If yes, an indication showing that the positive contactor, the negative contactor and the pre-charging contactor are turned off (for example, the high-voltage system circuit is in a fully open-circuit state) is output (SgD=1); or else, step S314 is followed.

At step S314, it is judged whether SgC=1, whether the load voltage is invalid, and whether I is less than or equal to $I_c$. If yes, an indication showing that at least one of the positive contactor, the negative contactor and the pre-charging contactor is in an on-state (for example, the high-voltage system circuit is not in a fully open-circuit state) is output (SgD=2); or else, step S315 is followed.

At step S315, if is judged whether $i_3$ is greater than or equal to $i_{c3}$ and whether SgC=1, in which $i_{c3}$ is a standard value representing the predetermined time. If yes, an indication showing that at least one of the positive contactor, the negative contactor and the pre-charging contactor has an error of turning on over time (for example, the high-voltage system circuit is not in an open-circuit state) is output (SgD=3); or else, step S316 is followed.

At step S316, it is set that $i_3=i_3+1$, and it is returned to the step S313.

With the method according to embodiments of the present disclosure, a priority of turning off the positive contactor PC, the negative contactor NC and the pre-charging contactor PreC in an urgent process of turning off contactors (such as relays), a control flow of the urgent process, and a condition for judging whether a relay is turned off are provided, thus enhancing the security of the electric vehicle and the power battery.

In an embodiment of the present disclosure, receiving the instruction of turning off a contactor (such as the positive contactor, the negative contactor, or the pre-charging contactor PreC) may be controlled via a vehicle key according to a battery state. In some embodiments, the contactor may be a relay. In some embodiments, a method for controlling a high-voltage system circuit of an electric vehicle comprises following steps.

At step S1, it is judged whether a condition of turning off a contactor is satisfied, and it is set that $i_1=0$ and $i_2=0$.

At step S2, it is judged whether ErrLvl is greater than 4, in which ErrLvl represents a level of an error. If yes, an error flag Err is set as 1; or else, Err is set as 0.

At step S3, it is judged whether I is less than or equal to $I_c$ and whether Err=0, in which I represents a current in the high-voltage system circuit illustrated in FIG. 1 and $I_c$ is a standard value. If I is less than $I_c$, Err=0, and a waiting time satisfies a first predetermined condition (for example, $i_2$ is greater than or equal to $i_{c2}$, in which $i_{c2}$ is a standard value), the condition of turning off a contactor is satisfied, and the contactor may be turned off; or else, step S4 is followed.

At step S4, it is judged whether $i_1$ is greater than or equal to $i_{c1}$ and whether Err=1. If yes, the condition of turning off a contactor is satisfied; or else, it is further judged whether $i_1$ is greater than or equal to $i_{c1}$ and whether Err=0. If $i_1$ is greater than or equal to $i_{c1}$ and Err=0, an error of turning on over time is output; or else, it is returned to the step S2.

At step S5, the positive contactor is turned off and it is set that $i_3=0$, $i_4=0$, and $i_5=0$. In other words, in this step, an actual turning off of a contactor is performed after the turning off condition is satisfied.

At step S6, it is judged whether $i_3$ is greater than or equal to $i_{c3}$ and whether ErrLvl is greater than 3 (or canceling the judging), in which $i_{c3}$ is a standard value. If yes, the negative contactor is turned off; or else, step S7 is followed.

At step S7, it is judged whether the waiting time satisfies a second predetermined condition. If the waiting time satisfies the second predetermined condition, step S8 is followed; or else, the step S6 is followed.

Figure 2:
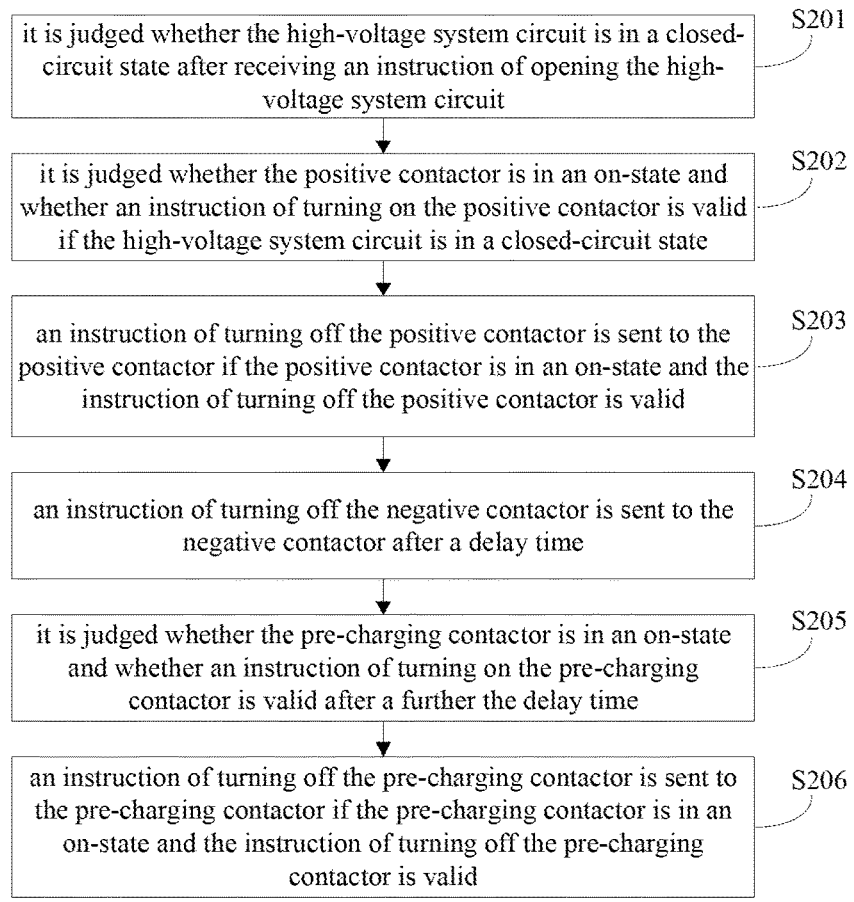
FIG. 2 is a flow chart of a method for controlling a high-voltage system circuit of an electric vehicle according to an embodiment of the present disclosure.

At step S8, it is judged whether U2 is greater than or equal to U1*(1+U_P1) or whether U2 is less than or equal to U1*(1−U_P1), in which U1 is a voltage illustrated in FIG. 1, U2 is a voltage illustrated in FIG. 2, U_P1 is a standard value. If yes, the negative contactor is turned off; or else, step S9 is followed.

At step S9, it is judged whether $i_4$ is greater than or equal to $i_{c4}$, or whether I is greater than $I_c$ and whether ErrLvl is less than 4. If yes, $i_{c4}$ is increased progressively, and it is returned to the step S8; or else, step S10 is followed.

At step S10, it is judged whether U2 is greater than or equal to U1*(1+U_P1) or whether U2 is less than or equal to U1*(1−U_P1), and whether I is less than or equal to $I_c$ and whether ErrLvl is less than 4. If yes, the negative contactor is turned off, and step S11 is followed.

At step S11, it is judged whether I is greater than $I_c$ and whether ErrLvl is less than 4. If yes, it is returned to the step S10; or else, step S12 is followed.

At step S12, it is judged whether the waiting time satisfies a third predetermined condition (for example, $i_5$ is greater than or equal to $i_{c5}$, in which $i_{c5}$ is a standard value). If yes, it is indicated that contactors are turned off; or else, it is returned to the step S12.

In some embodiments of the present disclosure, conditions for judging whether to turn off a contactor may include the level of an error, the current in the circuit and the waiting time, and factors such as the level of an error, time intervals, and timeout are considered before turning off a contactor. Accordingly, a method of judging whether a contactor is turned off is provided, such that the security and reliability of the process of turning off a contactor is guaranteed and optimized.

With the method for controlling a high-voltage system circuit of an electric vehicle according to embodiments of the present disclosure, when an urgent failure occurs, the instruction of turning off the positive contactor may be sent to the positive contactor after judging whether the positive contactor is in an on-state and whether the instruction of turning on the positive contactor is valid, the instruction of turning off the negative contactor may be sent to the negative contactor, the instruction of turning off the pre-charging contactor may be sent to the pre-charging contactor after judging whether the pre-charging contactor is in an on-state and whether the instruction of turning on the pre-charging contactor is valid, such that the high-voltage system circuit may be opened in an urgent situation. In this way, a hidden danger in the urgent situation may be removed, and the security of the electric vehicle and the power battery may be improved.

Figure 4:
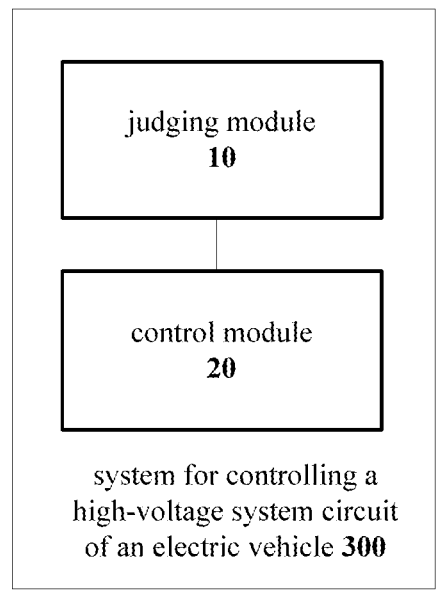
FIG. 4 is a block diagram of a system for controlling a high-voltage system circuit of an electric vehicle according to an embodiment of the present disclosure.

The system for controlling a high-voltage system circuit of an electric vehicle according to embodiments of the present disclosure will be described with reference to drawings. Referring to FIG. 1, the high-voltage system circuit comprises a power battery 100, a positive contactor PC, a pre-charging contactor PreC, a load 200 and a negative contactor NC. An anode of the power battery 100 is connected to the load 200 via the positive contactor PC, a cathode of the power battery 100 is connected to the load 200 via the negative contactor NC, and the pre-charging PreC contactor and the positive contactor PC are connected in parallel. Further, referring to FIG. 4, the system 300 for controlling a high-voltage system circuit of an electric vehicle comprises a judging module 10 and a control module 20.

In some embodiments, the judging module 10 is configure to judge whether the high-voltage system circuit is in closed-circuit state after receiving an instruction of opening the high-voltage system circuit, and to judge whether the positive contactor PC is in an on-state and whether an instruction of turning on the positive contactor PC is valid. If the judging module 10 determines the high-voltage system circuit is in a closed-circuit state, the control module 20 is further configured to judge whether the pre-charging contactor is in an on-state and whether an instruction of turning on the pre-charging contactor is valid. The control module 20 is configured to: send an instruction of turning off the positive contactor PC to the positive contactor PC if the judging module 10 determines that the positive contactor PC is in an on-state and the instruction of turning on the positive contactor PC is valid; send an instruction of turning off the negative contactor NC to the negative contactor NC after a delay time; send an instruction of turning off the pre-charging contactor PreC to the pre-charging contactor PreC if the judging module 10 determines that the pre-charging contactor PreC is in an on-state and the instruction of turning on the pre-charging contactor is valid after a further the delay time. With the system 300 according to embodiments of the present disclosure, all contactors in the high-voltage system circuit may be turned off, and therefore both safety and reliability of the system and the electric vehicle may be improved.

In an embodiment of the present disclosure, the control module 20 is further configured to send the instruction of turning off the positive contactor PC to the positive contactor PC, the instruction of turning off the negative contactor NC to the negative contactor NC and the instruction of turning off the pre-charging contactor PreC to the pre-charging contactor PreC directly, if the judging module 10 determines that the high-voltage system circuit is not in a closed-circuit state. In this way, it is further ensured that all of PC, NC and PreC are in the off-states.

In an embodiment of the present disclosure, referring to FIG. 3(a), the system 300 may be used to realize following steps.

At step S301, after receiving an instruction of opening the high-voltage system circuit (for example, an instruction of turning off all contactors) which is sent based on a situation including insulation requirement of vehicle, over-heat fault of battery, over-voltage of the battery, etc., it is set $i_1=0$, $i_2=0$, $i_3=0$, Sg=0, SgC=0, in which $i_1$, $i_2$ and $i_3$ are current flags related to U1, U2 and U3 shown in FIG. 1 respectively: Sg is a flag indicating whether an instruction of turning off a contactor is sent to one of the positive contactor PC, the negative contactor NC and the pre-charging contactor PreC, and if yes, Sg=1, or else, Sg=0; and SgC is a flag indicating whether instructions of turning off PC, NC and PreC are sent to the positive contactor PC, the negative contactor NC and the pre-charging contactor PreC respectively, and if yes, SgC=1, or else, SgC=0. In some embodiments, each of the positive contactor PC, the negative contactor NC and the pre-charging contactor PreC may be a relay.

At step S302, it is judged whether the positive contactor PC is in an on-state (or whether an instruction of turning on the positive contactor PC is valid) or whether the pre-charging contactor PreC is in an on-state (or whether an instruction of turning on the pre-charging contactor PreC is valid), and whether the negative contactor NC is in an on-state (or whether an instruction of turning on the negative contactor NC is valid). If yes, step S303 is followed; or else, the instruction of turning off the positive contactor PC is sent to the positive contactor PC, the instruction of turning off the negative contactor NC is sent to the negative contactor NC, and the instruction of turning off the pre-charging contactor PreC is sent to the pre-charging contactor PreC, SgC=1, and then step S313 is followed.

In an embodiment of the present disclosure, the control module 20 is further configured to send the instruction of turning off the negative contactor to the negative contactor directly if the positive contactor is not in an on-state or if the instruction of turning on positive contactor is invalid.

In an embodiment of the present disclosure, before sending the instruction of turning off the negative contactor to the negative contactor, the judging module 10 is further configured to judge whether the negative contactor is in an on-state and whether the instruction of turning on the negative contactor is valid, and to judge whether the pre-charging contactor is in an on-state and whether the instruction of turning on the pre-charging contactor is valid if the instruction of turning on the negative contactor is invalid.

In an embodiment of the present disclosure, referring to FIGS. 3(a) and 3(b), the control module 20 is specifically configured to perform following steps.

At step S303, it is judged whether the positive contactor PC is in an on-state and whether the instruction of turning on the positive contactor PC is valid. If yes, the instruction of turning off the positive contactor PC is sent to the positive contactor PC, Sg=1, and then step S304 is followed; or else, step S304 is followed.

At step S304, it is judged whether Sg=1. If yes, step S305 is followed; or else, step S307 is followed.

At step S305, it is judged whether $i_1$ is greater than or equal to $i_{c1}$, in which $i_{c1}$ is a standard value representing a waiting time after turning off the positive contactor PC. If yes, step S306 is followed; or else, $i_1=i_1+1$, and the step S305 is repeated.

At step S306, it is set that Sg=0, and then step S307 is followed.

At step S307, it is judged whether the negative contactor NC is in an on-state and whether the instruction of turning on the negative contactor NC is valid. If yes, the instruction of turning off the negative contactor NC is sent to the negative contactor NC, Sg=1, and then step S308 is followed; or else, step S308 is followed.

At step S308, it is judged whether Sg=1. If yes, step S309 is followed; or else, step S311 is followed.

At step S309, it is judged whether $i_2$ is greater than or equal to $i_{c2}$, in which $i_{c2}$ is a standard value representing a waiting time after turning off the negative contactor NC. If yes, step S310 is followed; or else, $i_2=i_2+1$, and step S309 is repeated.

At step S310, it is set Sg=0, and step S311 is followed.

At step S311, it is judged whether the pre-charging contactor PreC is in an on-state and whether the instruction of turning on the pre-charging contactor PreC is valid. If yes, the instruction of turning off the pre-charging contactor PreC is sent to the pre-charging contactor PreC, Sg=1, and step S312 is followed; or else, step S312 is followed.

At step S312, it is set SgC=1.

Figure 5:
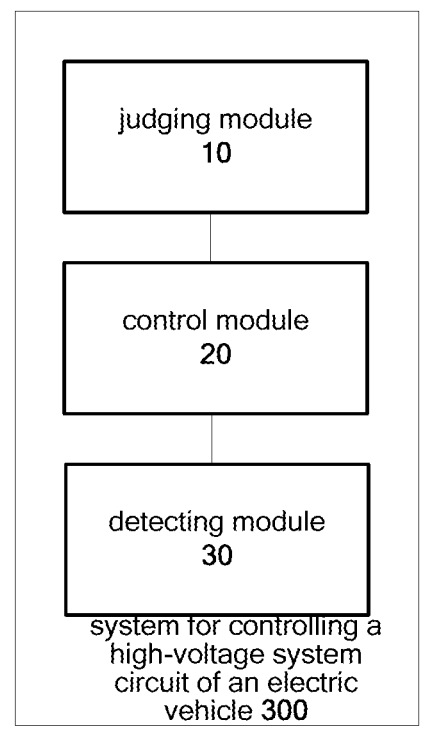
FIG. 5 is a block diagram of a system for controlling a high-voltage system circuit of an electric vehicle according to an embodiment of the present disclosure.

In an embodiment of the present disclosure, referring to FIG. 5, the system 300 further comprises a detecting module 30.

In some embodiments, the detecting module 30 is configured to detect an anode voltage U1 of the power battery and a voltage U2 between the load and the positive contactor after sending the instruction of turning off the positive contactor, the instruction of turning off the negative contactor and the instruction of turning off the pre-charging contactor. The judging module 10 is further configured to judge whether U2 is greater than or equal to U1*(1+U_P1) or whether U2 is less than or equal to U1*(1−U_P1), whether the delay time is less than a predetermined time, and whether a load voltage is valid, in which U_P1 is a standard value. The control module 20 is further configured to determined that the positive contactor, the negative contactor and the pre-charging contactor are each in an off-state if U2 is greater than or equal to U1*(1+U_P1) or if U2 is less than or equal to U1*(1−U_P1), the delay time is less than the predetermined time, and the load voltage is valid. The control module 20 is further configured to judge that at least one of the positive contactor, the negative contactor and the pre-charging contactor is in an on-state, if the load voltage is invalid and the delay time is less than the predetermined time. The control module 20 is further configured to judge that at least one of the positive contactor, the negative contactor and the pre-charging contactor has an error of turning on over time if the load voltage is invalid and the delay time is greater than or equal to the predetermined time.

In an embodiment of the present disclosure, referring to FIG. 3(c), the control module 20 is further used to perform following steps.

At step S313, it is judged whether U2 is greater than or equal to U1*(1+U_P1) or whether U2 is less than or equal to U1*(1−U_P1), whether SgC=1, whether a load voltage is valid, and whether I is less than or equal to $I_c$, in which U1 is a voltage illustrated in FIG. 1, U2 is a voltage illustrated in FIG. 1, U_P1 is a standard value, I is a current in the high-voltage system circuit illustrated in FIG. 1, $I_c$ is a standard value. If yes, an indication showing that the positive contactor, the negative contactor and the pre-charging contactor are turned off is output (SgD=1); or else, step S314 is followed.

At step S314, it is judged whether SgC=1, whether the load voltage is invalid, and whether I is less than or equal to $I_c$. If yes, an indication showing that at least one of the positive contactor, the negative contactor and the pre-charging contactor is turned off abnormally (for example, being in an on-state) is output (SgD=2); or else, step S315 is followed.

At step S315, if is judged whether $i_3$ is greater than or equal to $i_{c3}$ and whether SgC=1, in which $i_{c3}$ is a standard value representing the predetermined time. If yes, an indication showing that at least one of the positive contactor, the negative contactor and the pre-charging contactor has an error of turning on over time is output (SgD=3); or else, step S316 is followed.

At step S316, it is set that $i_3=i_3+1$, and it is returned to the step S313.

According to embodiments of the present disclosure, a priority of turning off the positive contactor PC, the negative contactor NC and the pre-charging contactor PreC in an urgent process of turning off contactors (such as relays), a control flow of the urgent process, and a condition for judging whether a relay is turned off are described, such that the security of the electric vehicle and the power battery may be enhanced.

In an embodiment of the present disclosure, receiving the instruction of turning off a contactor (the instruction of turning off the positive contactor, the instruction of turning off the negative contactor, the instruction of turning off the pre-charging contactor PreC) may be controlled through a key of the electric vehicle based on a battery state. In some embodiments, the contactor may be a relay. Said control may comprise following steps.

At step S1, it is judged whether a condition of turning off a contactor is satisfied, and it is set that $i_1=0$ and $i_2=0$.

At step S2, it is judged whether ErrLvl is greater than 4, in which ErrLvl represents a level of an error. If yes, an error flag Err is set as 1; or else, Err is set as 0.

At step S3, it is judged whether I is less than or equal to $I_c$ and whether Err=0, in which I represents a current in the high-voltage system circuit illustrated in FIG. 1, and $I_c$ is a standard value. If I is less than $I_c$, Err=0 and a waiting time satisfies a first predetermined condition (for example, $i_2$ is greater than or equal to $i_{c2}$, in which $i_{c2}$ is a standard value), the condition of turning off a contactor is satisfied, and the contactor may be turned off. If I is not less than $I_c$ or Err≠0, step S4 is followed.

At step S4, it is judged whether $i_1$ is greater than or equal to $i_{c1}$ and Err=1. If yes, the condition of turning off a contactor is satisfied; or else, it is judged whether $i_1$ is greater than or equal to $i_{c1}$ and whether Err=0. If $i_1$ is greater than or equal to $i_{c1}$ and Err=0, an error of turning on over time is output; or else, it is returned to the step S2.

At step S5, the positive contactor PC is turned off and it is set that $i_3=0$, $i_4=0$, $i_5=0$. In this step, the condition of turning off a contactor is satisfied, and the actual step of turning off a contactor is performed.

At step S6, it is judged whether $i_3$ is greater than or equal to $i_{c3}$ and whether ErrLvl is greater than or equal to 3 (or the judging is canceled), in which $i_{c3}$ is a standard value. If yes, the negative contactor is turned off; or else, step S7 is followed.

At step S7, it is judged whether the waiting time satisfies a second predetermined condition. If the waiting time satisfies the second predetermined condition, step S8 is followed; or else, it is returned to the step S6.

At step S8, it is judged whether U2 is greater than or equal to U1*(1+U_P1) or whether U2 is less than or equal to U1*(1−U_P1), in which U1 is a voltage illustrated in FIG. 1, U2 is a voltage illustrated in FIG. 2, and U_P1 is a standard value. If yes, the negative contactor is turned off; or else, step S9 is followed.

At step S9, it is judged whether $i_4$ is greater than or equal to $i_{c4}$, or whether I is greater than $I_c$ and whether ErrLvl is less than 4. If yes, $i_{c4}$ is increased progressively, and it is returned to the step S8; or else, step S10 is followed.

At step S10, it is judged whether U2 is greater than or equal to U1*(1+U_P1) or whether U2 is less than or equal to U1*(1−U_P1), whether I is less than or equal to $I_c$, and whether ErrLvl is less than 4. If yes, the negative contactor is turned off and step S11 is followed.

At step S11, it is judged whether I is greater than $I_c$ and whether ErrLvl is less than 4 after turning off the negative contactor. If yes, it is returned to the step S10; or else, step S12 is followed.

At step S12, it is judged whether the waiting time satisfies a third predetermined condition (for example, $i_5$ is greater than or equal to $i_{c5}$, in which $i_{c5}$ is a standard value). If yes, it is indicated that contactors are turned off; or else, it is returned to the step S12.

In some embodiments of the present disclosure, conditions for turning off contactors may include the level of an error, the current in the circuit and the waiting time, factors such as the level of an error, time intervals, and the overtime are considered before turning off a contactor, and a method of judging whether to turn off a contactor is provided accordingly, such that the security and reliability in the process of turning off a contactor is guaranteed.

With the system for controlling a high-voltage system circuit of an electric vehicle according to embodiments of the present disclosure, when an urgent failure occurs, the instruction of turning off the positive contactor may be sent to the positive contactor after judging whether the positive contactor is in an on-state and whether the instruction of turning on the positive contactor is valid, the instruction of turning off the negative contactor may be sent to the negative contactor, the instruction of turning off the pre-charging contactor may be sent to the pre-charging contactor after judging whether the pre-charging contactor is in an on-state and whether the instruction of turning on the pre-charging contactor is valid, such that all contactors in the high-voltage system circuit may be turned off accordingly and it is ensured that the high-voltage system circuit is in an open-circuit state, thus removing a hidden danger and enhancing the security of the electric vehicle and the power battery.

In addition, embodiments of the present disclosure provide an electric vehicle. The electric vehicle comprises the system for controlling a high-voltage system circuit of an electric vehicle described above.

With the electric vehicle according to embodiments of the present disclosure, when an urgent failure occurs, the instruction of turning off the positive contactor may be sent to the positive contactor after judging whether the positive contactor is in an on-state and whether the instruction of turning on the positive contactor is valid, the instruction of turning off the negative contactor may be sent to the negative contactor, the instruction of turning off the pre-charging contactor may be sent to the pre-charging contactor after judging whether the pre-charging contactor is in an on-state and whether the instruction of turning on the pre-charging contactor is valid, such that all contactors in the high-voltage system circuit may be turned off accordingly and it is ensured that the high-voltage system circuit is in an open-circuit state, thus removing a hidden danger and enhancing the security of the electric vehicle and the power battery.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

The storage medium mentioned above may be read-only memories, magnetic disks, CD, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for controlling a high-voltage system circuit of an electric vehicle, the high-voltage system circuit comprising a power battery, a positive contactor, a pre-charging contactor, a load and a negative contactor, an anode of the power battery being connected to the load via the positive contactor, a cathode of the power battery being connected to the load via the negative contactor, and the pre-charging contactor and the positive contactor being connected in parallel, wherein the method comprises the following acts performed by a control system:

judging whether the high-voltage system circuit is in a closed-circuit state after receiving an instruction of opening the high-voltage system circuit;

judging whether the positive contactor is in an on-state and whether an instruction of turning on the positive contactor is valid if the high-voltage system circuit is in a closed-circuit state;

sending an instruction of turning off the positive contactor to the positive contactor if the positive contactor is in an on-state and the instruction of turning on the positive contactor is valid;

sending an instruction of turning off the negative contactor to the negative contactor after a delay time;

judging whether the pre-charging contactor is in an on-state and whether an instruction of turning on the pre-charging contactor is valid after a further the delay time;

sending an instruction of turning off the pre-charging contactor to the pre-charging contactor if the pre-charging contactor is in an on-state and the instruction of turning on the pre-charging contactor is valid;

detecting an anode voltage U1 of the power battery and a voltage U2 between the load and the positive contactor after sending the instruction of turning off the positive contactor, the instruction of turning off the negative contactor and the instruction of turning off the pre-charging contactor;

judging whether U2 is greater than or equal to U1*(1+U_P1) or whether U2 is less than or equal to U1*(1−U_P1), whether the delay time is less than a predetermined time, and whether a load voltage is valid, in which U_P1 is a standard value;

determining that the positive contactor, the negative contactor and the pre-charging contactor each are in an off-state if U2 is greater than or equal to U1*(1+U_P1) or if U2 is less than or equal to U1*(1−U_P1), the delay time is less than the predetermined time, and the load voltage is valid; and determining that at least one of the positive contactor, the negative contactor and the pre-charging contactor is in an on-state if the load voltage is invalid and the delay time is less than the predetermined time; and determining that at least one of the positive contactor, the negative contactor and the pre-charging contactor has an error of turning on over time if the load voltage is invalid and the delay time is greater than or equal to the predetermined time.

2. The method according to claim 1, further comprising: sending the instruction of turning off the positive contactor to the positive contactor, the instruction of turning off the negative contactor and the instruction of turning off the pre-charging contactor to the pre-charging contactor if the high-voltage system circuit is not in a closed-circuit state.

3. The method according to claim 2, further comprising: judging whether the negative contactor is in an on-state and whether an instruction of turning on the negative contactor is valid; and judging whether the pre-charging contactor is in an on-state and whether the instruction of turning on the pre-charging contactor is valid if the instruction of turning on the negative contactor is invalid.

4. The method according to claim 1, further comprising: sending the instruction of turning off the negative contactor to the negative contactor if the positive contactor is not in an on-state or if the instruction of turning on the positive contactor is invalid.

5. The method according to claim 4, further comprising: judging whether the negative contactor is in an on-state and whether an instruction of turning on the negative contactor is valid; and judging whether the pre-charging contactor is in an on-state and whether the instruction of turning on the pre-charging contactor is valid if the instruction of turning on the negative contactor is invalid.

6. The method according to claim 1, further comprising: judging whether the negative contactor is in an on-state and whether an instruction of turning on the negative contactor is valid; and judging whether the pre-charging contactor is in an on-state and whether the instruction of turning on the pre-charging contactor is valid if the instruction of turning on the negative contactor is invalid.

7. A system for controlling a high-voltage system circuit of an electric vehicle, the high-voltage system circuit comprising a power battery, a positive contactor, a pre-charging contactor, a load and a negative contactor, an anode of the power battery being connected to the load via the positive contactor, a cathode of the power battery being connected to the load via the negative contactor, and the pre-charging contactor and the positive contactor being connected in parallel, wherein the system comprises:

a judging module configured to:
judge whether the high-voltage system circuit is in a closed-circuit state after receiving an instruction of opening the high-voltage system circuit;
judge whether the positive contactor is in an on-state and whether an instruction of turning on the positive contactor is valid if the high-voltage system circuit is in a closed-circuit state; and
judge whether the pre-charging contactor is in an on-state and whether an instruction of turning on the pre-charging contactor is valid, and a control module configured to:
send an instruction of turning off the positive contactor to the positive contactor if the judging module determines that the positive contactor is in an on-state and the instruction of turning on the positive contactor is valid;
send an instruction of turning off the negative contactor to the negative contactor after a delay time, and send an instruction of turning off the pre-charging contactor to the pre-charging contactor if the judging module determines that the pre-charging contactor is in an on-state and the instruction of turning on the pre-charging contactor is valid after a further the delay time;

a detecting module configured to detect an anode voltage U1 of the power battery and a voltage U2 between the load and the positive contactor after sending the instruction of turning off the positive contactor, the instruction of turning off the negative contactor and the instruction of turning off the pre-charging contactor;

wherein the judging module is further configured to judge whether U2 is greater than or equal to U1*(1+U_P1) or whether U2 is less than or equal to U1*(1−U_P1), whether the delay time is less than a predetermined time, and whether a load voltage is valid, in which U_P1 is a standard value;

the control module is further configured to:
   determine that the positive contactor, the negative contactor and the pre-charging contactor each are in an off-state if U2 is greater than or equal to U1*(1+ U_P1) or if U2 is less than or equal to U1*(1−U_P1), the delay time is less than the predetermined time, and the load voltage is valid;
   determine that at least one of the positive contactor, the negative contactor and the pre-charging contactor is in an on-state if the load voltage is invalid and the delay time is less than the predetermined time; and
   determine that at least one of the positive contactor, the negative contactor and the pre-charging contactor has an error of turning on over time if the load voltage is invalid and the delay time is greater than or equal to the predetermined time; and wherein at least one of the judging module, control module or detecting module is implemented at least in part by a processor and a non-transitory computer-readable medium comprising instructions stored thereon and executable by the processor.

8. The system according to claim 7, wherein the control module is further configured to send the instruction of turning off the positive contactor to the positive contactor, the instruction of turning off the negative contactor to the negative contactor and the instruction of turning off the pre-charging contactor to the pre-charging contactor if the judging module determines that the high-voltage system circuit is not in a closed-circuit state.

9. The system according to claim 8, wherein the judging module is further configured to judge whether the negative contactor is in an on-state and whether an instruction of turning on the negative contactor is valid, and to judge whether the pre-charging contactor is in an on-state and whether the instruction of turning on the pre-charging contactor is valid if the instruction of turning on the negative contactor is invalid.

10. The system according to claim 7, wherein the control module is further configured to send the instruction of turning off the negative contactor to the negative contactor if the positive contactor is not in an on-state or if the instruction of turning on the positive contactor is invalid.

11. The system according to claim 10, wherein the judging module is further configured to judge whether the negative contactor is in an on-state and whether an instruction of turning on the negative contactor is valid, and to judge whether the pre-charging contactor is in an on-state and whether the instruction of turning on the pre-charging contactor is valid if the instruction of turning on the negative contactor is invalid.

12. The system according to claim 7, wherein the judging module is further configured to judge whether the negative contactor is in an on-state and whether an instruction of turning on the negative contactor is valid, and to judge whether the pre-charging contactor is in an on-state and whether the instruction of turning on the pre-charging contactor is valid if the instruction of turning on the negative contactor is invalid.

13. An electric vehicle comprising a system for controlling a high-voltage system circuit, the high-voltage system circuit comprising a power battery, a positive contactor, a pre-charging contactor, a load and a negative contactor, an anode of the power battery being connected to the load via the positive contactor, a cathode of the power battery being connected to the load via the negative contactor, and the pre-charging contactor and the positive contactor being connected in parallel, wherein the system comprises:

a judging module configured to:
   judge whether the high-voltage system circuit is in a closed-circuit state after receiving an instruction of opening the high-voltage system circuit;
   judge whether the positive contactor is in an on-state and whether an instruction of turning on the positive contactor is valid if the high-voltage system circuit is in a closed-circuit state; and
   judge whether the pre-charging contactor is in an on-state and whether an instruction of turning on the pre-charging contactor is valid, and a control module configured to:
   send an instruction of turning off the positive contactor to the positive contactor if the judging module determines that the positive contactor is in an on-state and the instruction of turning on the positive contactor is valid;
   send an instruction of turning off the negative contactor to the negative contactor after a delay time, and
   send an instruction of turning off the pre-charging contactor to the pre-charging contactor if the judging module determines that the pre-charging contactor is in an on-state and the instruction of turning on the pre-charging contactor is valid after a further the delay time;

a detecting module configured to detect an anode voltage U1 of the power battery and a voltage U2 between the load and the positive contactor after sending the instruction of turning off the positive contactor, the instruction of turning off the negative contactor and the instruction of turning off the pre-charging contactor;

wherein the judging module is further configured to judge whether U2 is greater than or equal to U1*(1+U_P1) or whether U2 is less than or equal to U1*(1−U_P1), whether the delay time is less than a predetermined time, and whether a load voltage is valid, in which U_P1 is a standard value; and the control module is further configured to:
   determine that the positive contactor, the negative contactor and the pre-charging contactor each are in an off-state if U2 is greater than or equal to U1*(1+ U_P1) or if U2 is less than or equal to U1*(1−U_P1), the delay time is less than the predetermined time, and the load voltage is valid;
   determine that at least one of the positive contactor, the negative contactor and the pre-charging contactor is in an on-state if the load voltage is invalid and the delay time is less than the predetermined time; and determine that at least one of the positive contactor, the negative contactor and the pre-charging contactor has an error of turning on over time if the load voltage is invalid and the delay time is greater than or equal to the predetermined time.

14. The electric vehicle according to claim 13, wherein the control module is further configured to send the instruction of turning off the positive contactor to the positive contactor, the instruction of turning off the negative contactor to the negative contactor and the instruction of turning off the pre-charging contactor to the pre-charging contactor if the judging module determines that the high-voltage system circuit is not in a closed-circuit state.

* * * * *